US005226119A

United States Patent [19]

Asai

[11] Patent Number: 5,226,119

[45] Date of Patent: Jul. 6, 1993

[54] GRAPHIC DISPLAY CONTROLLER

[75] Inventor: Nobuteru Asai, Hitachi, Japan

[73] Assignee: Hitachi, Ltd., Tokyo, Japan

[21] Appl. No.: 378,502

[22] Filed: Jul. 11, 1989

Related U.S. Application Data

[63] Continuation of Ser. No. 881,231, Jul. 2, 1986, abandoned.

[30] Foreign Application Priority Data

Jul. 3, 1985 [JP] Japan ................................ 60-144787

[51] Int. Cl.[5] ................................................ G06F 3/14

[52] U.S. Cl. ................................................... 395/163

[58] Field of Search ................ 340/800, 801; 364/518, 364/521

[56] References Cited

U.S. PATENT DOCUMENTS

| | | | |
|---|---|---|---|
| 3,976,982 | 8/1976 | Eiselen | 340/724 X |
| 4,070,710 | 1/1978 | Sukonick et al. | 364/200 X |
| 4,165,506 | 8/1979 | Brands et al. | 340/799 X |
| 4,615,018 | 9/1986 | Sakano | 364/900 |
| 4,616,220 | 10/1986 | Grunewald et al. | 340/747 |
| 4,635,049 | 1/1987 | Dodge et al. | 340/801 X |
| 4,701,863 | 10/1987 | Bruce | 340/799 X |

*Primary Examiner*—D. L. Clark

*Attorney, Agent, or Firm*—Antonelli, Terry, Stout & Kraus

[57] ABSTRACT

A graphic memory in which a bit of storage element is allocated to each pixel of an image to be displayed on a CRT monitor is provided. A source data transferred by a direct memory access controller is shifted by a barrel shift circuit. The resultant data and the data read from the graphic memory are subjected to an operation, and the obtained data is again stored in the graphic memory.

2 Claims, 13 Drawing Sheets

GRAPHIC DISPLAY CONTROLLER

This application is a continuation of application Ser. No. 881,231, filed Jul. 2, 1986, now abandoned.

BACKGROUND OF THE INVENTION

The present invention relates to a graphic display controller for displaying characters, symbols, pictures, graphs, and the like on a display screen A display control circuit for storing the level of brightness as "1" and "0" for each pixel of the screen according to the bit map refresh method is necessary to display characters, images, or graphs. There has been known a multiwindow display as means for enhancing the operability by simultaneously displaying a plurality of objects on a screen by use of the display control circuit. The multiwindow display is achieved by superimposing screen data or a plurality of rectangular subscreens having a variable size. The invention of the Japanese Patent Unexamined Publication No. 59-75338 accomplishes the multiwindow display by using two memory units and a direct memory access controller (to be abbreviated as DMAC herebelow) transferring data between the memory units. Although the invention is characterized by implementing a high-speed multiwindow display, the DMAC is so restricted that the data can be transferred in byte or word units, namely, data having a bit-unit boundary cannot be transferred. Furthermore, the CPU can access only the first memory, and the second memory and the DMAC are configured as a dedicated hardware, which can not be used for other than the processing executed by the CPU.

In the multiwindow display, the characters, images, or graphs need by positioned in bit units on the screen; and the DMAC usually comprises a plurality of channels and is hence desirably applied to a plurality of usages. The screen display data formed in the second memory not accessible from the CPU cannot be used by the CPU for other purposes (printing, for example); or the data cannot be stored in a temporary storage or cannot be read for the further processing.

SUMMARY OF THE INVENTION

It is therefore an object of the present invention to provide a graphic display controller which enables the graphic processing of graphic display data in a graphic memory at a high speed with a reduced load on the CPU.

Another object of the present invention is to provide a graphic display controller in which a new data item to be drawn in the graphic memory can be arbitrarily shifted in bit units for the display.

According to the present invention, there is provided a graphic display controller including a direct memory access controller for transferring dot data to be developed in two dimensions, a pattern memory for storing dot pattern data, a graphic memory in which at least a one-bit storage element is allocated to each pixel of an image to be displayed on a display screen, and a read, modify, write control means for reading stored data from the graphic memory in a first-half of a write cycle of the graphic memory according to the direct memory access controller and for writing the data in the graphic memory in a last-half of the write cycle including the following:

A shift device for shifting in units of an arbitrary number of bits of the dot data supplied by the direct access controller.

Logic operation circuitry for effecting a logic operation between the dot data read from the graphic memory by the read, modify, write control means and the dot data Outputted from the shift device.

Select apparatus for selecting bit units of either the dot data read from the graphic memory or the dot data outputted from said logic operation circuitry and for supplying the selected dot data to the graphic memory.

BRIEF DESCRIPTION OF THE DRAWINGS

The present invention will be apparent from the following detailed description taken in conjunction with the accompanying drawings in which.

DETAILED DESCRIPTION OF THE PREFERRED EMBODIMENTS

A description will be given of an example of the word processor according to the present invention.

Figure 2:
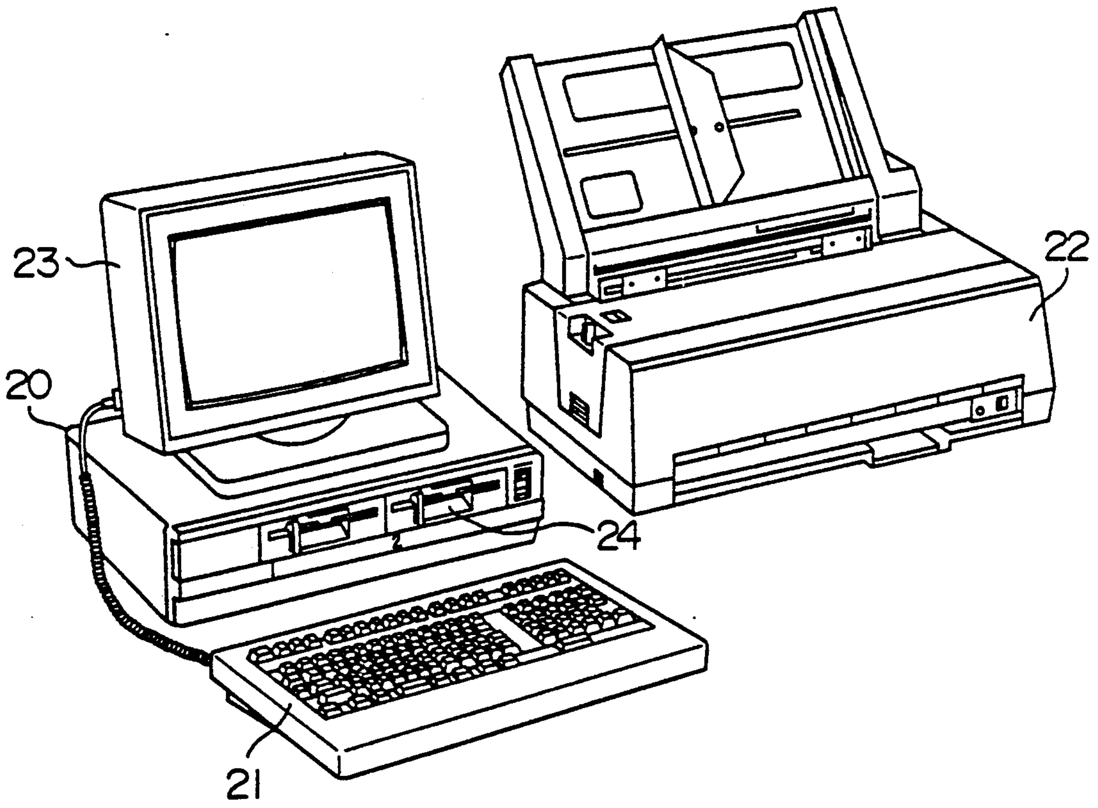
FIG. 2 is the appearance of a word processor to which the display control circuit is applied.
Figure 3:
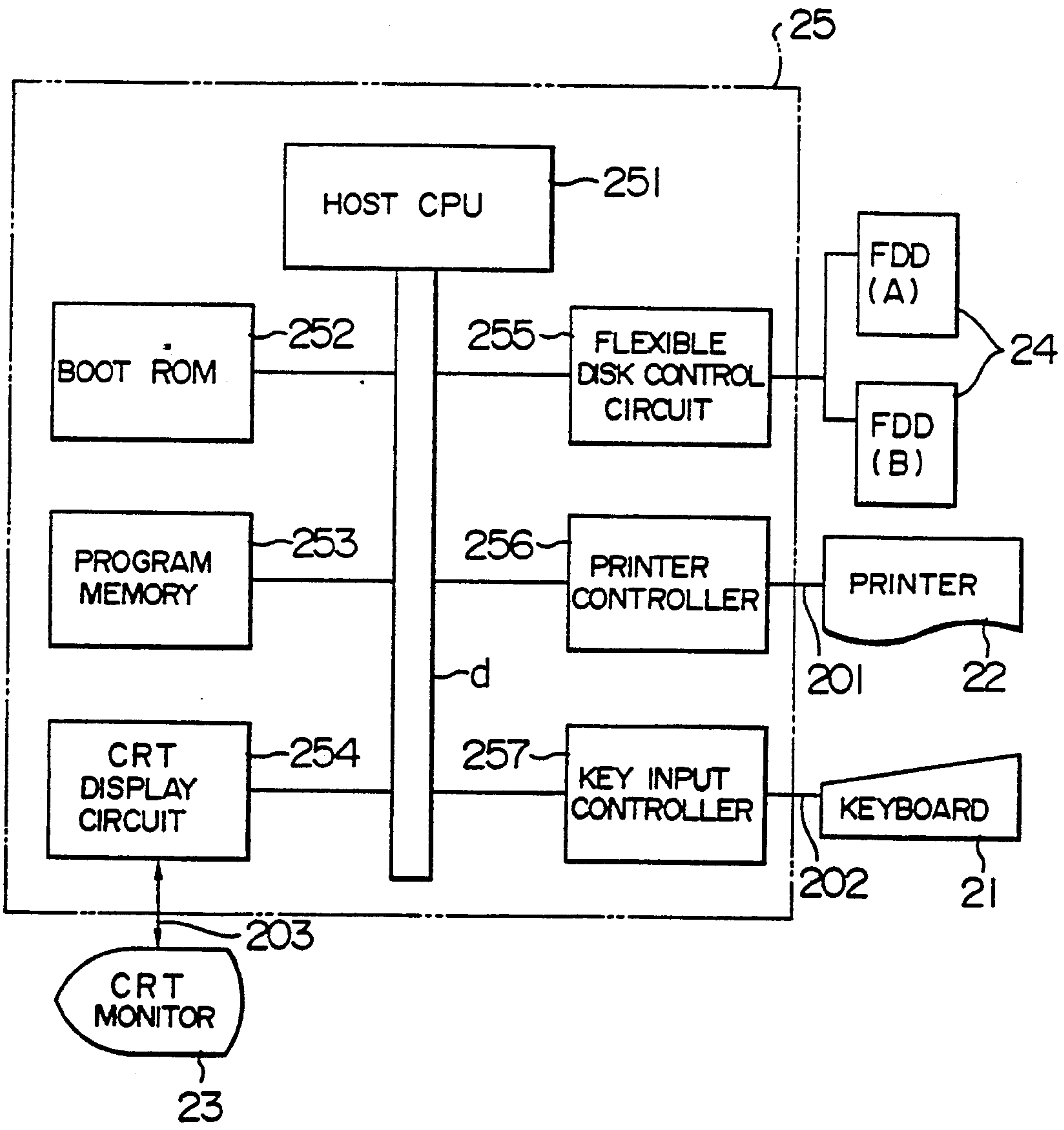
FIG. 3 is a schematic block diagram of the word processor to which the display control circuit is applied.

The word processor of this embodiment includes, as shown in FIG. 2, a main unit 20 having a temporary storage unit and a control unit, a keyboard 21 as an input unit, a printer 22 as a printing unit, and a CRT monitor 23 as a display unit. As shown in FIG. 3, control and information signals are communicated through cables 201–203 203 between the main unit 20 (shown in FIG. 2) and the printer 22, the keyboard 21, and the CRT monitor 23. In FIG. 2, reference numeral 24 indicates a flexible disk drive unit (to be abbreviated as FDD herebelow).

The main unit 20 includes a control unit 25 as indicated in a frame of broken lines in the block diagram of the control unit shown in FIG. 3. The control unit 25 comprises a central processing unit, CPU 251 including a CPU, a boot ROM 252 including a read-only memory, ROM which contains a program to be executed when power is turned on, a program memory 253 including a random access memory, RAM for storing programs and information to effect the function as a word processor, a CRT display circuit 254 for generating a screen display pattern according to an instruction from the CPU 251 and for transmitting video signals to the CRT monitor 23, a flexible disk controller, FDC 255 for controlling the FDD 24 according to an instruction from the CPU 251, a printer controller 256 for transmitting a signal controlling the printer 22 and print characters to the printer 22 according to an instruction from the CPU 251 and for receiving a status signal of the printer 22 therefrom and for sending the signal to the CPU 251, a key input controller 257 for controlling the keyboard 21 according to an instruction from the CPU 251 and for sending an input signal from the keyboard 21 to the CPU 251, and a CPU bus d for connecting the CPU 251, the boot ROM 252, the program memory 253, the CRT display unit 254, the FDC 255, the printer controller 256, and the key input controller 257.

The FDD 24 drives a flexible disk such as a magnetic recording medium, records information thereon, and reads the recorded information therefrom. On the front surface of the main unit 20, there is provided an opening of the FDD 24.

Next, the overall operation of the word processor will be described. When the system configuration described above is powered, the system operates according to the program of the ROM 252 to move into the program memory 253 the program which is stored on the flexible disk installed in the FDD 24 and which has the processing flow of FIG. 4 to enable the function of the word processor; thereafter, the system starts the operation of the word processor according to the program moved into the program memory 253.

In this specification, the subfunction or auxiliary function is used to comprehensively indicate functions, for example, to copy document data from a flexible disk onto another flexible disk.

Figure 5:
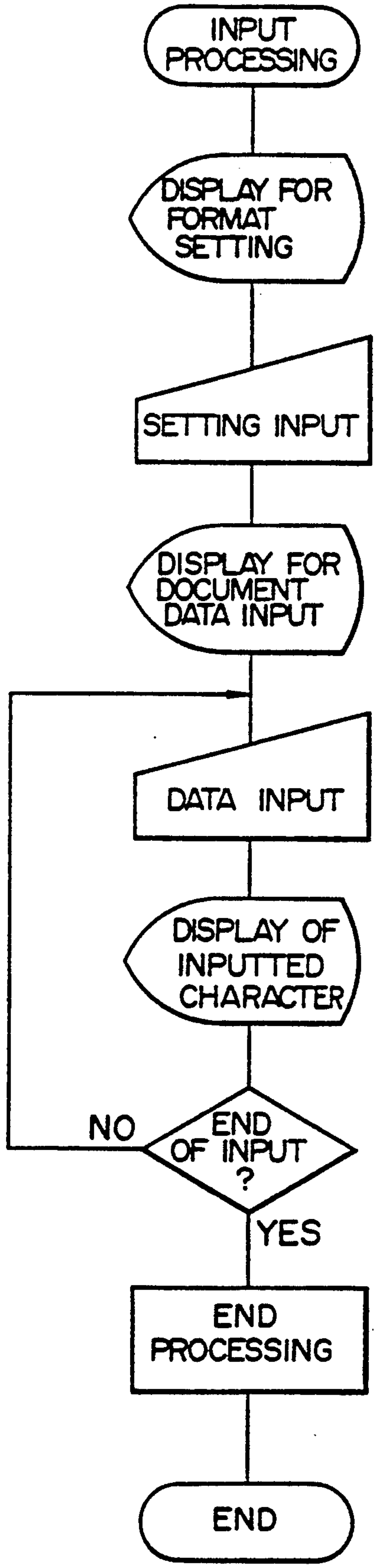
FIG. 5 is a flowchart of an input processing in the processing flow of FIG. 4.

When an input processing is selected by an operation select input, the input processing program having the processing flow of FIG. 5 is executed. When the CRT display circuit 254 is controlled according to the input processing program of FIG. 5 stored in the program memory 253 and a screen display pattern is generated in the graphic memory of the CRT display circuit 254, then the pattern is converted into video signals, which are supplied to the CRT monitor 23, thereby displaying a document during the input processing on the screen of the CRT monitor. The instructions of processing associated with the document data input are effected according to the data and function instructions inputted from the keyboard 21.

When only the kanji characters or chinese characters are to be displayed through the CRT display circuit 254, the CPU 251 passes data to an I/O program controlling the CRT display circuit 254 in a data unit equivalent to a line of the display screen. That is, when character data is inputted from the keyboard 21 in character units and a line of data including the last input character at the end thereof is obtained, the CPU 251 initiates a subprogram to control the CRT display circuit 254.

The operator sequentially inputs data character by character, whereas the CPU 251 must execute the display processing of a line of data for the CRT display circuit; consequently, the input processing in the CPU 251 and the drawing processing on the screen by use of the CRT display circuit must be instantaneously achieved. After this point, the same operation is repetitiously executed until an end of data input is supplied, thereby displaying the input data on the CRT monitor 23.

Figure 4:
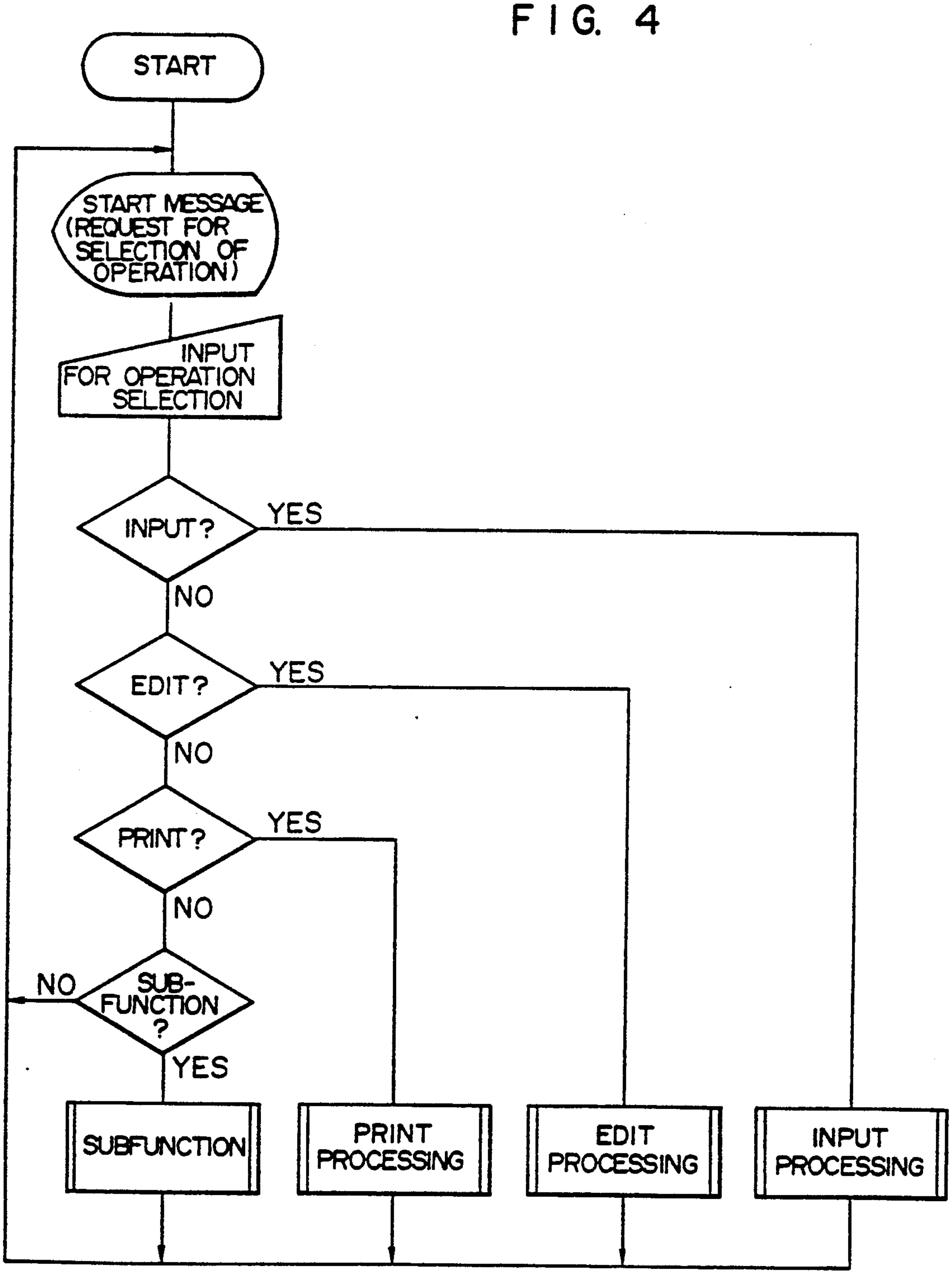
FIG. 4 is a flowchart of operation of the word processor to which the display control circuit is applied.

When the instruction of the end of data input is inputted from the keyboard 21, the CPU 251 detects the insturction and performs an end processing to terminate the input processing of FIG. 5, then prepares for the next processing as shown in the flowchart of FIG. 4. In the end processing, the input data is written on the flexible disk for the temporary storage.

In an edit processing of FIG. 4, the contents of the screen are rewritten according to a functional instruction inputted from the keyboard 21. Also in other processing, the instructions and historical information about the operations are displayed on the CRT monitor 23.

Figure 1:
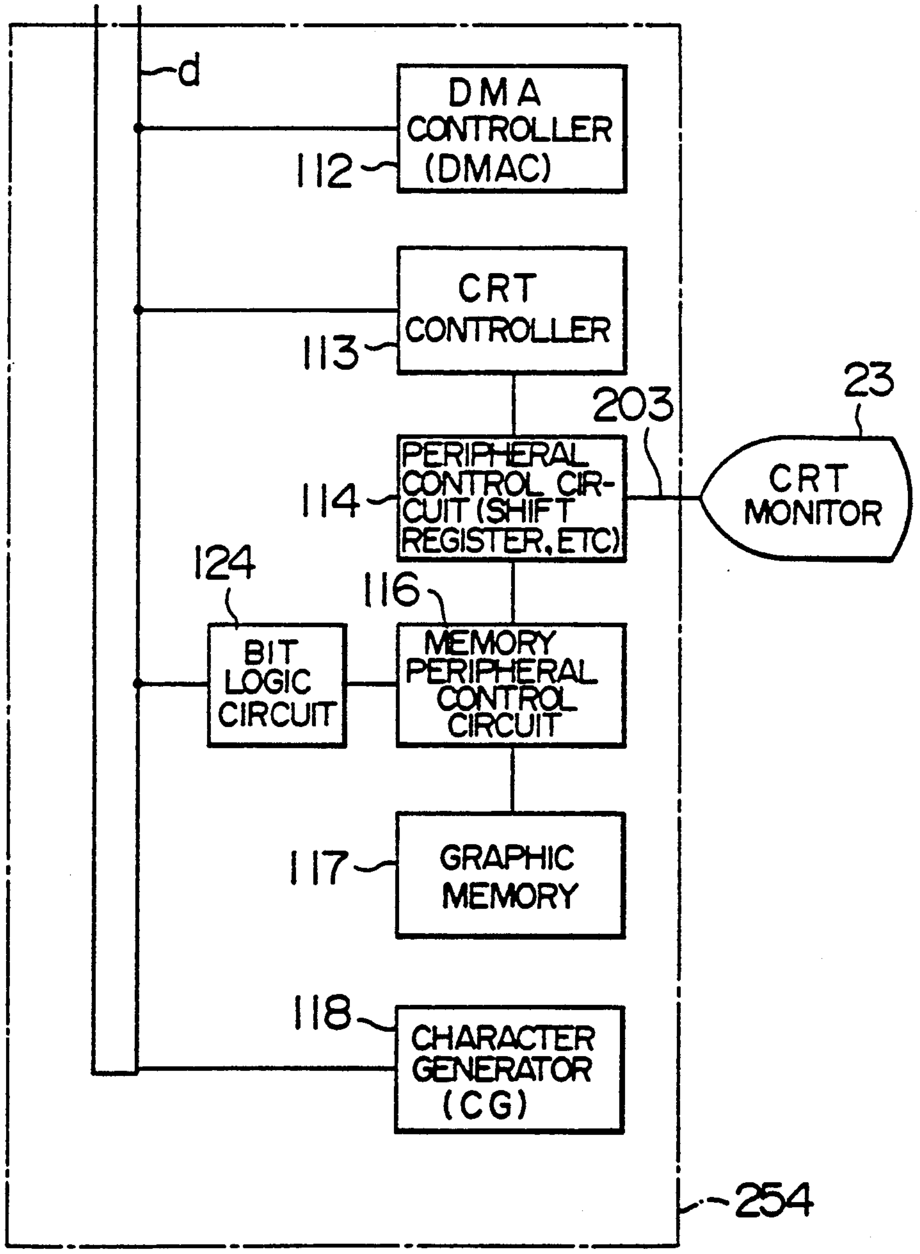
FIG. 1 is a schematic block diagram of a display control circuit according to the present invention.

Next, the CRT display circuit 254 will be described with reference to the block diagram of FIG. 1.

The CRT display circuit 254 comprises a DMA controller 112, DMAC (for which the Hitachi's HD68450 is suitable) for reading, according to the specification of internal registers, instructions stored in an array chain configuration in the program memory 253 and transferring data from the program memory 253, character generator, CG 118, and graphic memory 117 to a specified address of the graphic memory 117; a CRT controller 113 for generating an address signal to sequentially read the contents of the graphic memory 117 and a synchronization signal for controlling the CRT monitor 23, a peripheral control circuit 114 having shift registers converting parallel data read from the graphic memory 117 into video signals and a driver circuit supplying the synchronization signal from the CRT controller 113 to the CRT monitor 23, a memory peripheral control circuit 116 for controlling in a timeshared manner an access signal from the CPU bus d and an access signal from the CRT controller 113 to supply the access signals to a graphic memory 117, thereby transmitting data from the memory, a graphic memory 117 including a dynamic RAM having a bit map in which the storage elements are set for each bit of the pixels on the screen, a character generator, CG 118 including a ROM for storing dot matrix patterns for Chinese, kana (Japanese syllabary), and alphanumeric characters; and a bit logic circuit, BLU 124 locating between the CPU bus d and the memory peripheral control circuit 116.

Figure 6:
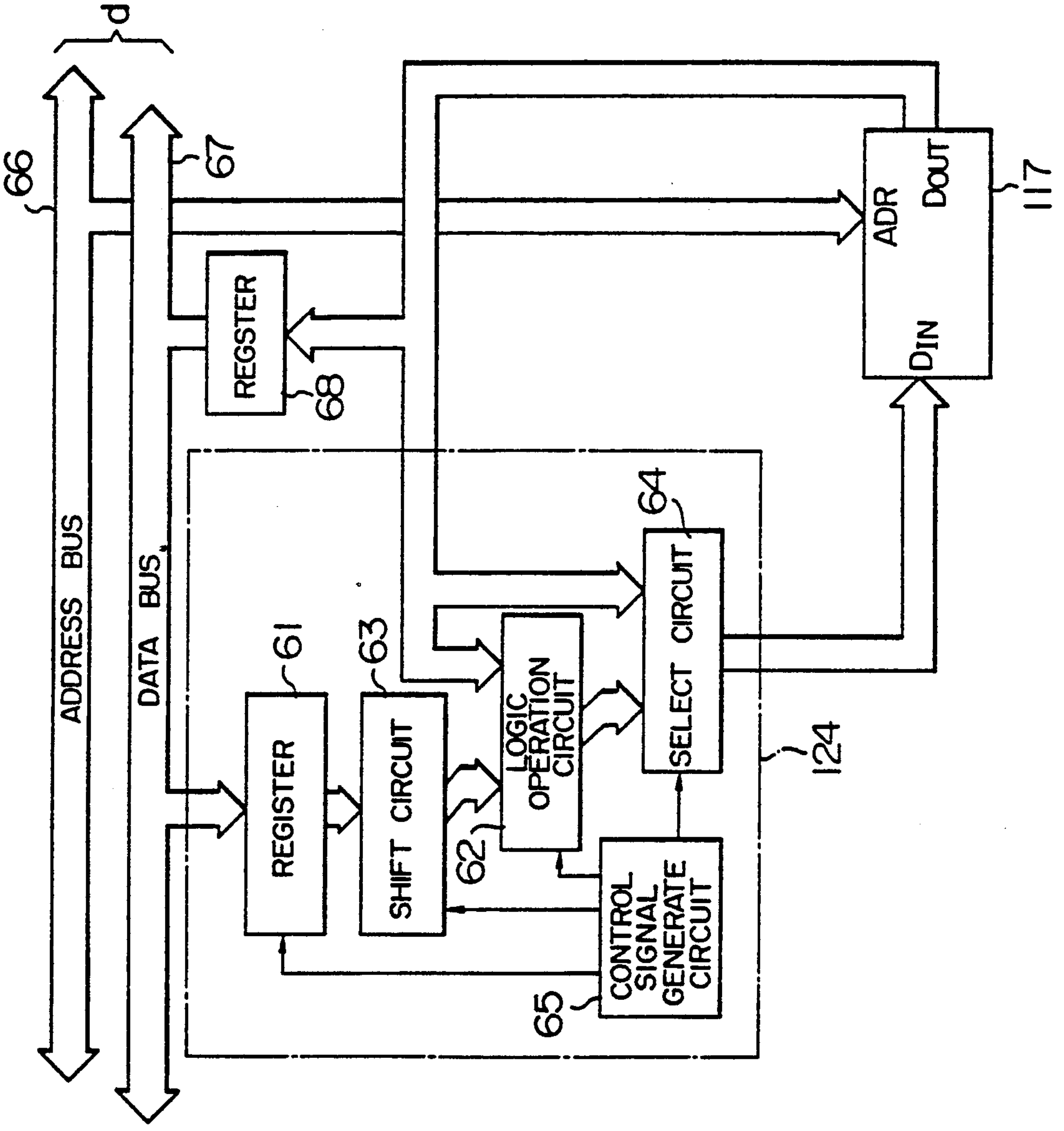
FIG. 6 is a block diagram illustrating details about BLU and relationships with the graphic memory.
Figure 7:
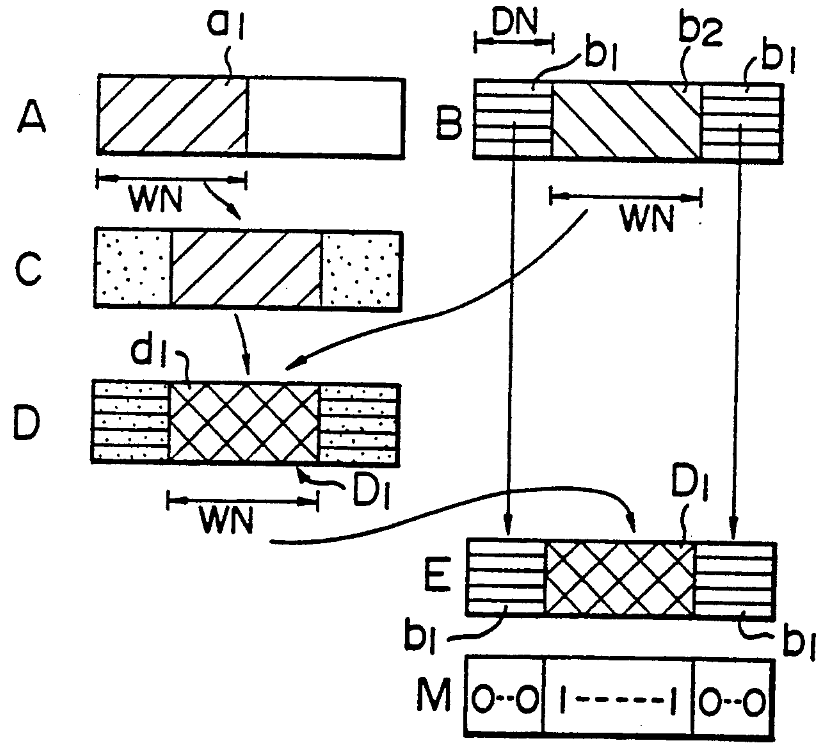
FIG. 7 is a schematic diagram depicting bit handling of the BLU.

The configuration and function of the BLU 124 will be next described with reference to FIGS. 6–7. FIG. 6 is a schematic block diagram for explaining the flow of data from the CPU bus d to the graphic memory 117 in which components such as the data bus and address bus from the memory peripheral control circuit 116 and the peripheral control circuit 114 are omitted. The BLU 124 comprises a register unit 61 for latching data from the CPU, an logic operation circuit 62, a barrel shift circuit 63, a select circuit 64, and a control signal generate circuit 65 for specifying the shift amount, the width of data to be converted, and the kind of operation and for supplying a select signal to the select circuit 64. In the control signal generate circuit 65, there are provided registers for keeping the control information fed from the CPU 251. The transfer paths for transferring the information to and from such registers are not shown in FIG. 6. The control information includes a bit position information, DN and a bit width information, WN for controlling the shift amount and the width of data to be converted, respectively and operation specification information for specifying the operation type of conversion. The CPU bus d comprises an address bus 66 from the CPU and a data bus 67 therefrom. A register 68 latches data read from the graphic memory 117 and delivers the data to the CPU bus 67.

The processing to access the graphic memory 117 through the BLU 124 includes a write and a read by the CPU 251 and a write and a read associated with a transfer operation by the DMAC 112. When a data write operation is effected on the graphic memory 117 by the CPU 251 or the DMAC 112, the data obtained through the BLU 124 and the data read from the graphic memory 117 are subjected to an operation in the logic operation circuit 62, and the resultant data is written in the graphic memory 117.

The flow of data in the BLU 124 will be described with reference to FIG. 7. Data A is a source data supplied from the CPU 251 or the DMAC 112. Only the bits of the bit width information WN are the effective data. Assume that based on the WN bits of the source data A and the contents ($b_2$) of the WN bits beginning from the bit position information DN of data B read from the graphic memory 117, the operation of the specified type is conducted, and the data of $b_2$ is replaced with the resultant data. In this case, the content of $b_1$ must be kept unchanged. Prior to this processing, the data A is first latched into the register 61 and is thereafter shifted by the DN bits in the barrel shift circuit 63, which outputs data like data C. By effecting an operation between the data C and the data B, data D is obtained; however, the data to be written in the graphic memory 117 must be of the format of data E. To generate such a data item, the select circuit 64 is required. The control signal generate circuit 65 generates mask data M according to the information of DN and WN and supplies the mask data M as a select signal to the select circuit 64. With the data D and B inputted to the select circuit 64, if a bit of the mask data M is "0", the select circuit 64 outputs the content of the data B to the corresponding bit of the graphic memory 117; and if the bit is "1", the content of the data D is outputted.

As can be seen from the description, the CPU 251 or the DMAC 112 executes a write operation for the graphic memory 117, which is however actually accessed in the read, modify, write mode.

Figure 8:
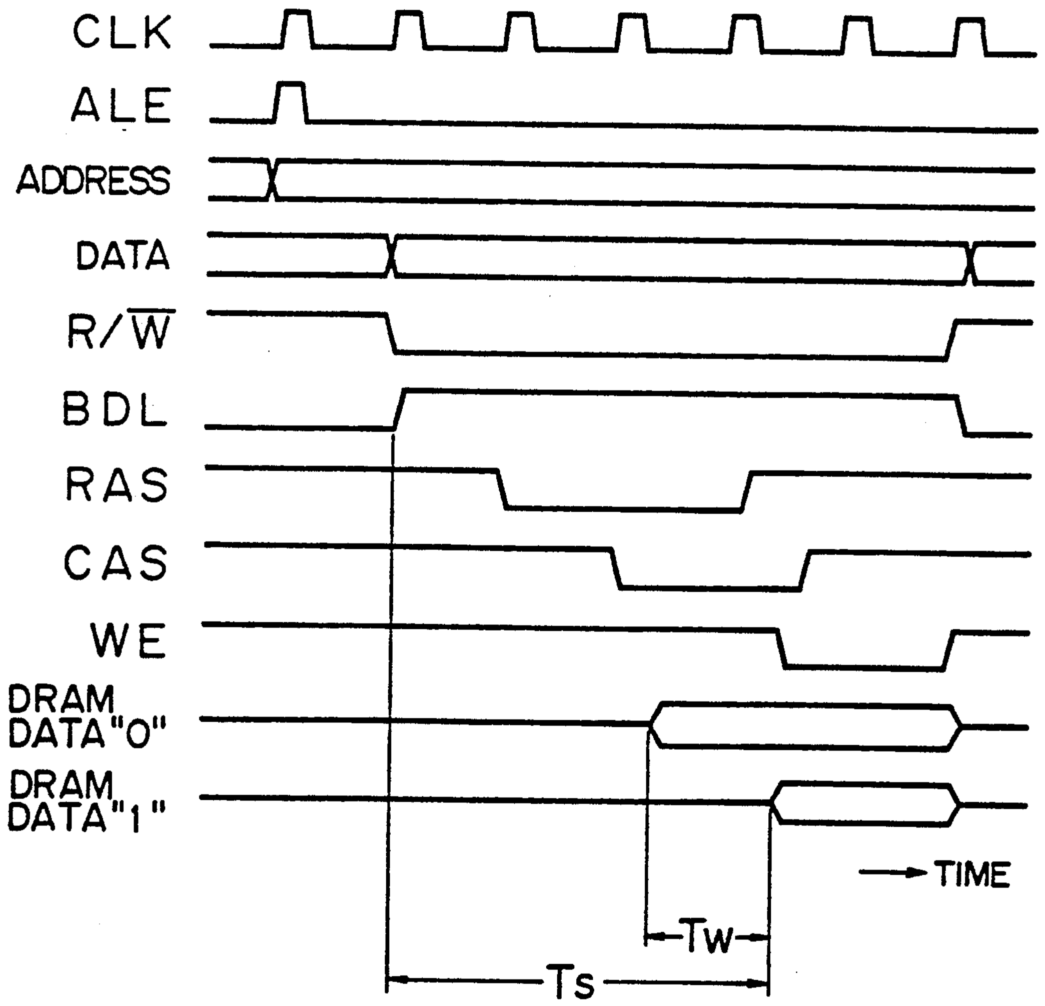
FIG. 8 is a timing chart for explaining the operation of the read, modify, write operation.
Figure 9:
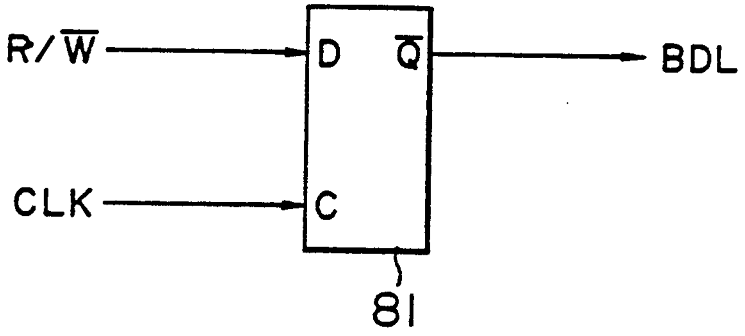
FIG. 9 is a schematic circuit diagram of the latch lock generate circuit.

FIG. 8 is a timing chart of an example of the read, modify, write timing in which CLK, ALE, ADDRESS, and DAA represent the system clock of the CPU, the latch clock of the address buffer, an output to the address bus of the CPU bus d, and an output to the data bus thereof, respectively. For example, as shown in FIG. 9, if the latch clock BDL can be generated only with the read/write control signal R/W and the system clock CLK by use of a D-type flip-flop 81, the data can be set to the register 61 any time at an appearance of a write signal on the CPU bus d regardless of the address value on the CPU bus d. Naturally, the BDL may be generated only when the CPU 251 or the DMAC 112 attempts to write data in the graphic memory 117.

DRAMDATA "0" is an output data from the graphic memory 117, whereas DRAMDATA "1" is an input data thereto. Consequently, the arithmetic processing time allowed for the arithmetic operation circuit 62 is Tw. All processing to be achieved in the BLU 124 from when the data is set to the register 61 must be completed within Ts. Since Tw and Ts are usually about 100 ns and 300 ns, respectively, the processing time is sufficient. In the description of FIG. 8, the operation of the CRT monitor 23 to read data from the graphic memory 117 is not considered; however, the control of contention between an access from the CPU bus d and a read for the display on the CRT monitor 23 is controlled by the memory peripheral control circuit 116.

Figure 10:
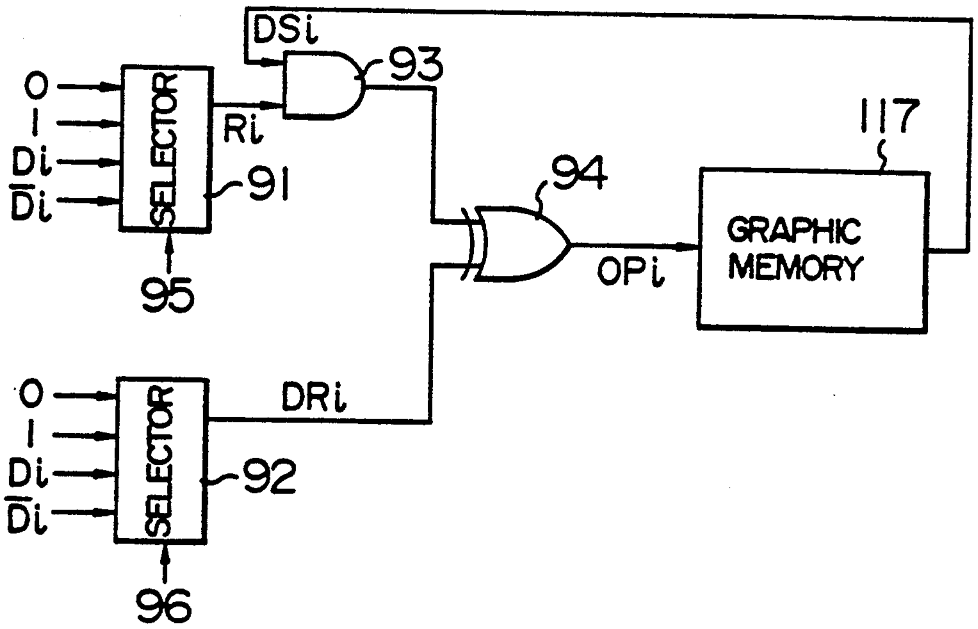
FIG. 10 is a schematic circuit diagram of the logic operation circuit.

FIG. 10 is a schematic diagram of an example of the arithmetic circuit 62, which includes selectors 91–92, an AND element 93, and an exclusive OR element 94. With such a simple structure, this circuit effects 16 types of dyadic operations on the data from the CPU bus d as shown in Table 1. The circuit diagram further includes control lines 95–96 for specifying the operation types with the total of four bits, a data item Di from the CPU bus d, an negation $\overline{Di}$ of the data item Di, and a data item DSi read from the graphic memory 117. In a usual memory transfer, namely, when data from the CPU bus d is directly written in the graphic memory 117, the arithmetic operation need only be specified as follows: bit width information WN=1 byte or word, bit position information DN=$\phi$, and operation result OPi=Di. The arithmetic operation circuit 62 may also be constituted from an ordinary ALU.

TABLE 1

| DRi | Ri | OPi |
|---|---|---|
| 0 | 0 | 0 |
| 0 | 1 | DSi |
| 0 | Di | $Di \cdot DSi$ |
| 0 | $\overline{Di}$ | $\overline{Di} \cdot DSi$ |
| 1 | 0 | 1 |
| 1 | 1 | $\overline{DSi}$ |
| 1 | Di | $\overline{Di} + \overline{DSi}$ |
| 1 | $\overline{Di}$ | $Di + \overline{DSi}$ |
| Di | 0 | Di |
| Di | 1 | $Di \oplus DSi$ |
| Di | Di | $Di \cdot \overline{DSi}$ |
| $\overline{Di}$ | $\overline{Di}$ | $\overline{Di} + DSi$ |
| $\overline{Di}$ | 0 | $\overline{Di}$ |
| $\overline{Di}$ | 1 | $\overline{Di \oplus DSi}$ |
| $\overline{Di}$ | Di | $\overline{Di} + DSi$ |
| $\overline{Di}$ | $\overline{Di}$ | $\overline{Di} \cdot \overline{DSi}$ |

The addresses to be supplied to the graphic memory 117 are listed in Table 2. When the host CPU 251 handles 24 bits×24 bits character patterns, a 3-byte depth is set in the scanning direction and a 24-byte depth is set in the vertical direction with respect to the scanning line, that is, the size of blocks located at consecutive addresses becomes large. Consequently, the address allocation listed in Table 2 is advantageous, namely, the number of bank changeover operations causing the overhead in the block transfer can be reduced. The changeover operation is carried out in the memory peripheral control circuit 116.

TABLE 2

| CRT ADDRESS | CPU ADDRESS | MEMORY ADDRESS |
|---|---|---|
| CA0 | A10 | BANK CHANGE |
| CA1 | A11 | CA0 |
| CA2 | A12 | RA0 |
| CA3 | A13 | RA1 |
| CA4 | A14 | RA2 |
| CA5 | A15 | RA3 |
| CA6 | A16 | RA4 |
| CA7 | A0 | CA1 |
| CA8 | A1 | RA5 |
| CA9 | A2 | RA6 |
| CA10 | A3 | RA7 |
| CA11 | A4 | CA2 |
| CA12 | A5 | CA3 |

TABLE 2-continued

| CRT ADDRESS | CPU ADDRESS | MEMORY ADDRESS |
|---|---|---|
| CA13 | A6 | CA4 |
| CA14 | A7 | CA5 |
| CA15 | A8 | CA6 |
| CA16 | A9 | CA7 |

Figure 11:
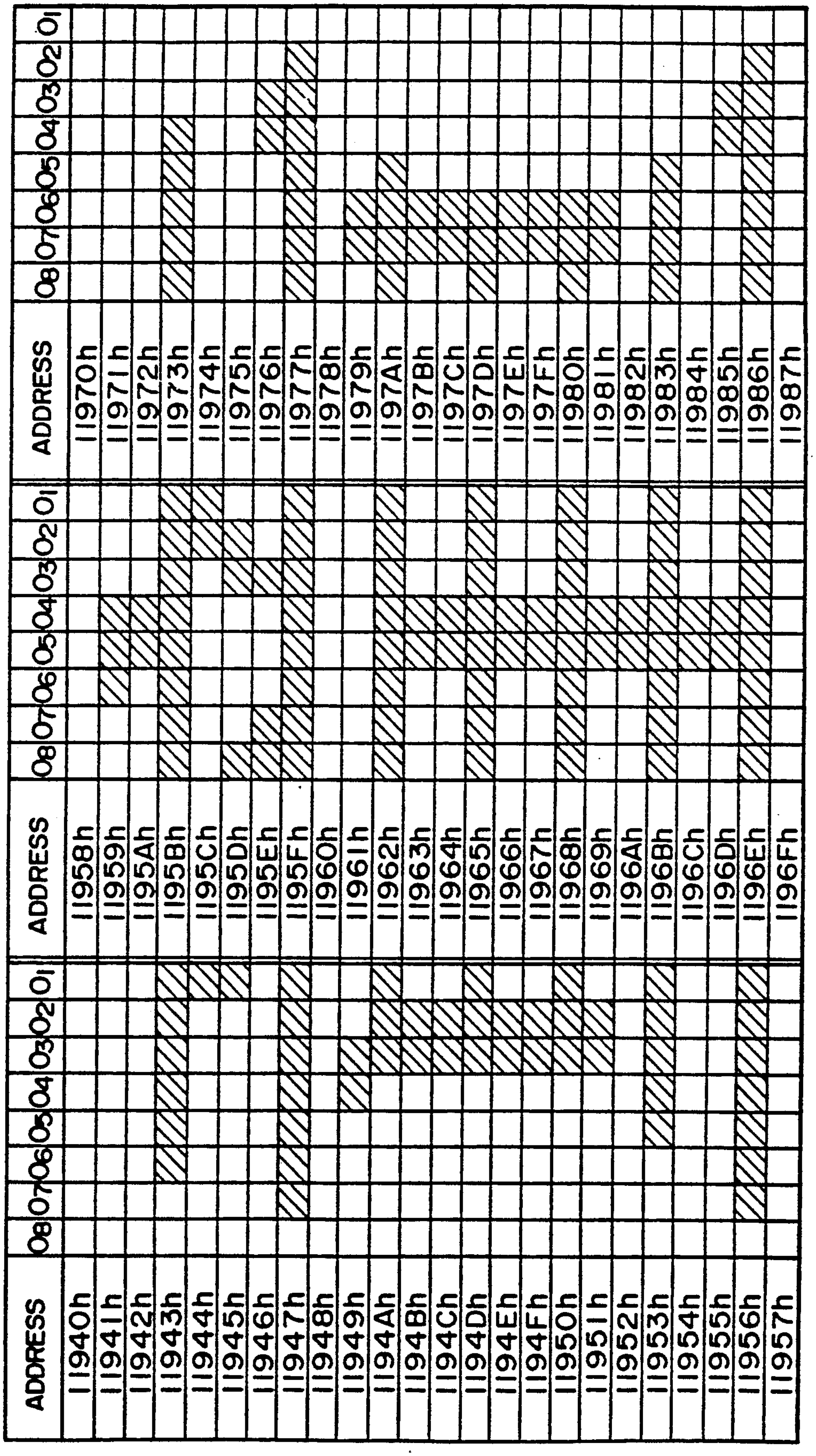
FIG. 11 is a diagram schematically showing an example of the character pattern in the CG.

FIG. 11 is a schematic diagram showing the configuration of a character pattern stored in the character generator 118. A character pattern for a character comprises consecutive 72 bytes, which are subdivided into a 24-byte left section, a 24-byte middle section, and a 24-byte right section. This character pattern indicates a Chinese character "童" having a character number (0668) in hexadecimal notation.

Figure 12:
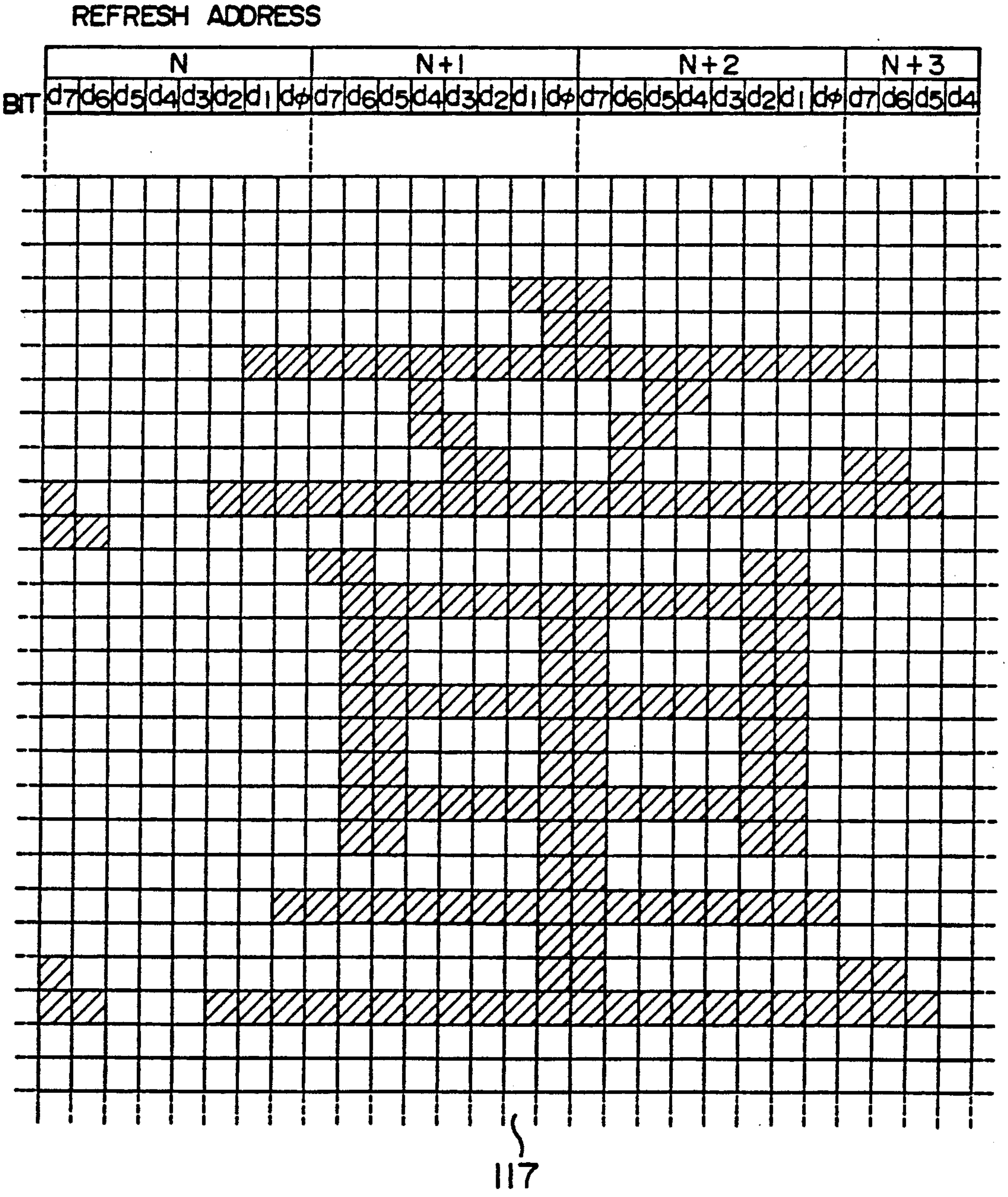
FIG. 12 is a schematic diagram illustrating the drawing of a character pattern in the graphic memory.
Figure 13:
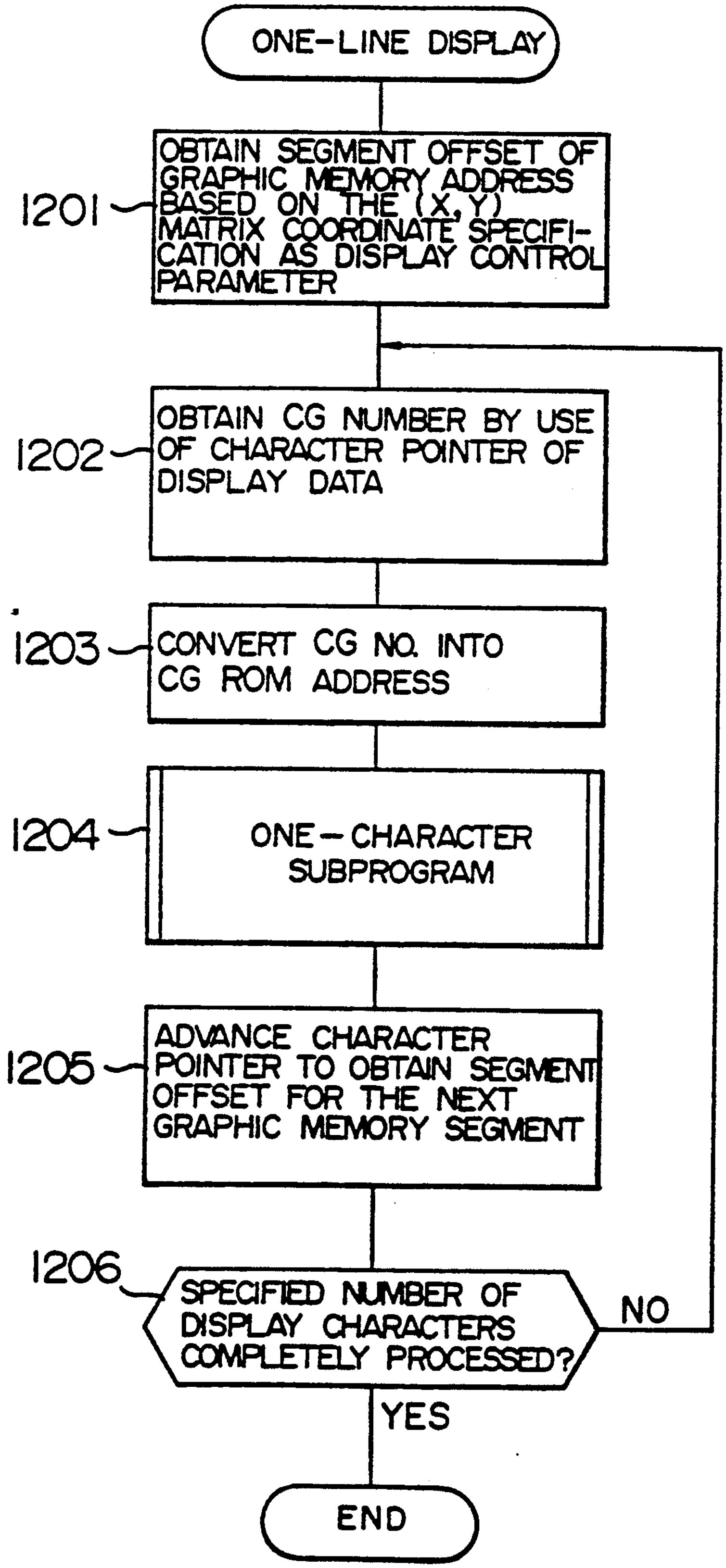
FIG. 13 is a flowchart of a program for displaying a line.
Figure 14:
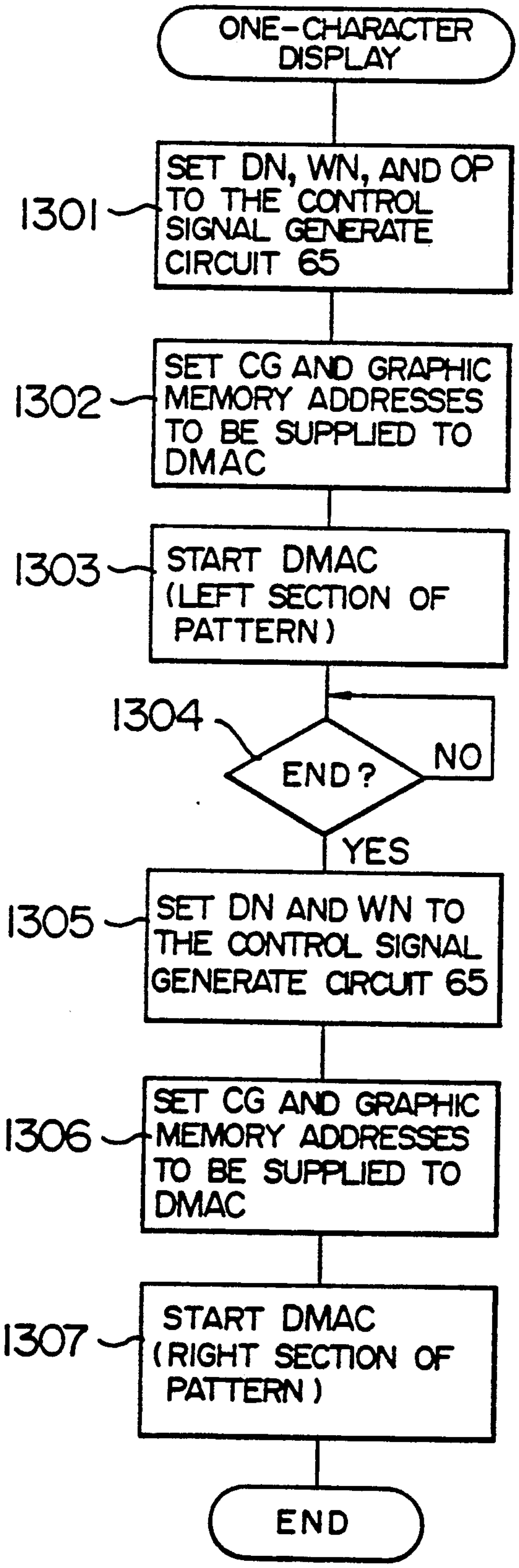
FIG. 14 is a flowchart of a subprogram for displaying a character.

NEXT, processing to draw the Chinese character OF FIG. 11 in a character pattern area allocated as a portion of the graphic memory 117 instantiated in FIG. 12 will be described with reference to FIGS. 13–14.

The character is drawn in the graphic memory 117 on the line-by-line basis. The drawing processing of a line is as shown in FIG. 13. Details of block 1204 including the one-character display subprogram will be shown in FIG. 14. In the example of FIG. 12, the Chinese character "童" read from the CG 118 must be shifted by four bits so to be stored in the graphic memory 117. For this purpose, in processing step 1301; shift amount DN=4, write width=4, and OPi=Di are set to the control signal generate circuit 65 of the BLU 124. In the next processing step 1302, an instruction is set to the program memory 253 so that the DMAC 112 transfers from the character generator 118 to the graphic memory 117 the left, middle, and right sections each comprising 24 bytes by use of the array chain, and then the first address of the instruction block is set to the DMAC 112. When the DMAC 112 is started in the processing step 1303, the DMAC 112 draws four left-most bits of the character pattern, four bits with a 4-bit interval, and another four bits with a 4-bit interval. During these operations, the host CPU 251 performs another processing and recognizes the end of the processing described above through an interruption as shown in the processing step 1304. Next, to draw the remaining 4-bit patterns for the data for which the drawing has been started, the processing step 1301 sets shift amount DN=−4 and write width=4 to the control signal generate circuit 65 of the BLU 124. In the same manner as described above, a command specification is set by use of the array chain to cause the DMAC 112 to draw the character pattern.

Although only the 4-bit shift applies to the drawing processing of character patterns in the foregoing operation example, it can be easily understood that the same operation is effected with another number of shift bits.

In this example, a description has been made of a case where a new character pattern is drawn. If DSi is specified for the OPi in the register 61 of the BLU 124, the reverse display is achieved in the pertinent area, which can also be use to effect so-called cursor drawing processing.

For the multiwindow display, the clip display can be achieved for each bit by specifying the bit in the bit width information WN. Consequently, the boundary can be set in bit units in the multiwindow display. Not only for the window generation but also for the recovery of the lower window of the overlapped windows associated with a cancellation of a window, the provision described above can be efficiently utilized.

Although the character pattern is transferred from the CG 118 to the graphic memory 117 by use of the DMAC 112 in this example, it is clear that the same function can be accomplished by a control circuit having a function to transfer two-dimensional data.

I claim:

1. A graphic display controller apparatus comprising:

a pattern memory for storing dot data;

a graphic memory in which at least a one-bit storage element is allocated to each pixel of an image to be displayed on a display screen;

a direct memory access controller connected to said pattern memory and said graphic memory for transferring dot data of an image represented by a dot matrix as parallel data in bit or word units from said pattern memory to said graphic memory;

read, modify, write control means for, in response to control provided by said direct memory access controller, reading in parallel dot data from said graphic memory, said dot data including bit or word units, and said reading being performed in a former half of a write cycle of said graphic memory and writing the dot data in parallel into said graphic memory, said dot data including bit or work units, and said writing being performed in a latter half of the write cycle of said graphic memory; and bit logic means for performing shifting and logic operations on said dot data from said direct memory access controller and dot data from said read, modify, write control means respectively, said bit logic means including a barrel shifter for shifting simultaneously and in parallel units of an arbitrary number of bits of the dot data supplied in parallel by the direct memory access controller and for outputting in parallel shifted dot data, logic operation means for effecting a parallel logic operation on each of a plurality of pairs of dot data of corresponding bit positions, each pair of dot data includes dot data of one bit or one word read in parallel from said graphic memory by said read, modify, write control means and dot data of one bit or one word outputted in parallel from said barrel shifter, and for outputting in parallel dot data resulting from the parallel logic operation, select means, for each bit of dot data, for selecting one bit unit from said each pair of dot data of corresponding bit positions including dot data of one bit or one word read in parallel from the graphic memory and dot data of one bit or one word outputted in parallel from said logic operation means and for supplying the selected dot data to the graphic memory as parallel data in bit or word units, and control signal generating means for generating a first signal for controlling an amount of shift of the dot data applied to said barrel shifter and applying said first signal to said barrel shifter, for generating a second signal for controlling the parallel logic operation of said logic operation means and applying said second signal to said logic operation means, and for generating a third signal for controlling the selection operation of said select means and applying said third signal to said select means.

2. A graphic display controller according to claim 1, wherein an address sequence in a scanning line direction of said graphic memory corresponds with an address sequence for access from said direct memory access controller; and wherein said direct memory access controller reads in parallel dot data from a character generator in byte or word units and supplies said dot data to said barrel shifter, and said logic operation means effects a parallel logic operation between the dot data read out in parallel in byte or word units from said graphic memory and dot data outputted in parallel from said barrel shifter.

* * * * *